United States Patent [19]
Hoffland

[11] 3,721,265
[45] March 20, 1973

[54] THREE-WAY VALVE

[75] Inventor: Joseph V. Hoffland, Minneapolis, Minn.

[73] Assignee: FMC Corporation, San Jose, Calif.

[22] Filed: April 29, 1971

[21] Appl. No.: 138,507

[52] U.S. Cl..............................137/625.47, 251/312
[51] Int. Cl..............................................F16k 11/00
[58] Field of Search ....137/625.47, 625.48; 251/309, 251/310, 311, 312

[56] References Cited

UNITED STATES PATENTS

| | | | |
|---|---|---|---|
| 2,991,804 | 7/1961 | Merkle | 137/625.47 X |
| 3,185,179 | 5/1965 | Harautuneian | 137/625.47 |
| 2,298,771 | 10/1942 | Lamar | 137/625.47 |
| 3,012,752 | 12/1961 | Buck | 251/309 |
| 2,475,702 | 7/1949 | Funke | 137/625.47 X |
| 2,725,121 | 11/1955 | Lowe | 251/309 X |
| 2,853,102 | 9/1958 | Walker | 137/625.47 X |
| 2,854,027 | 9/1958 | Kaiser et al. | 137/625.47 X |
| 3,484,078 | 12/1969 | Haenky | 251/312 X |
| 38,610 | 5/1863 | Stewart | 251/311 |

Primary Examiner—Samuel Scott
Attorney—F. W. Anderson, C. E. Tripp and R. S. Kelly

[57] ABSTRACT

A three-way valve includes a rotatable valve plug which has a generally T-shaped passageway therethrough to permit transfer of fluid between a main port selectively to or from either or both side ports of the valve. The plug is exteriorly recessed so as to provide secondary flow paths on the periphery of the plug from the central leg of the T-shaped passageway to the side legs thereof so that there will be no spaces in the plug passageway where fluid will stagnate when the plug is rotated to direct the flow between the main port and only one of the side ports.

6 Claims, 6 Drawing Figures

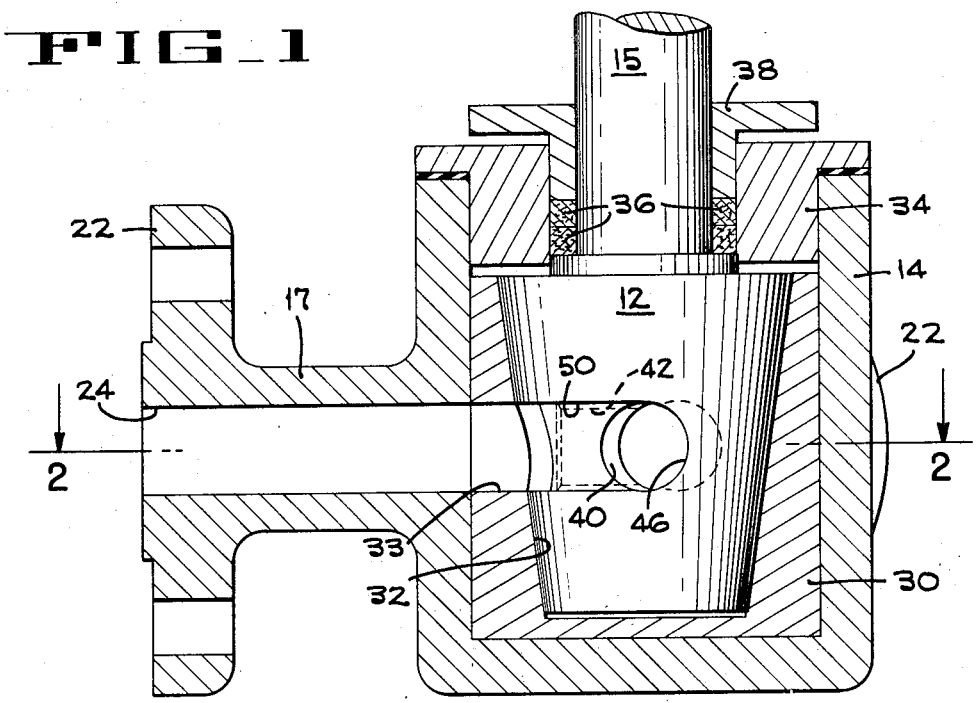
FIG_1
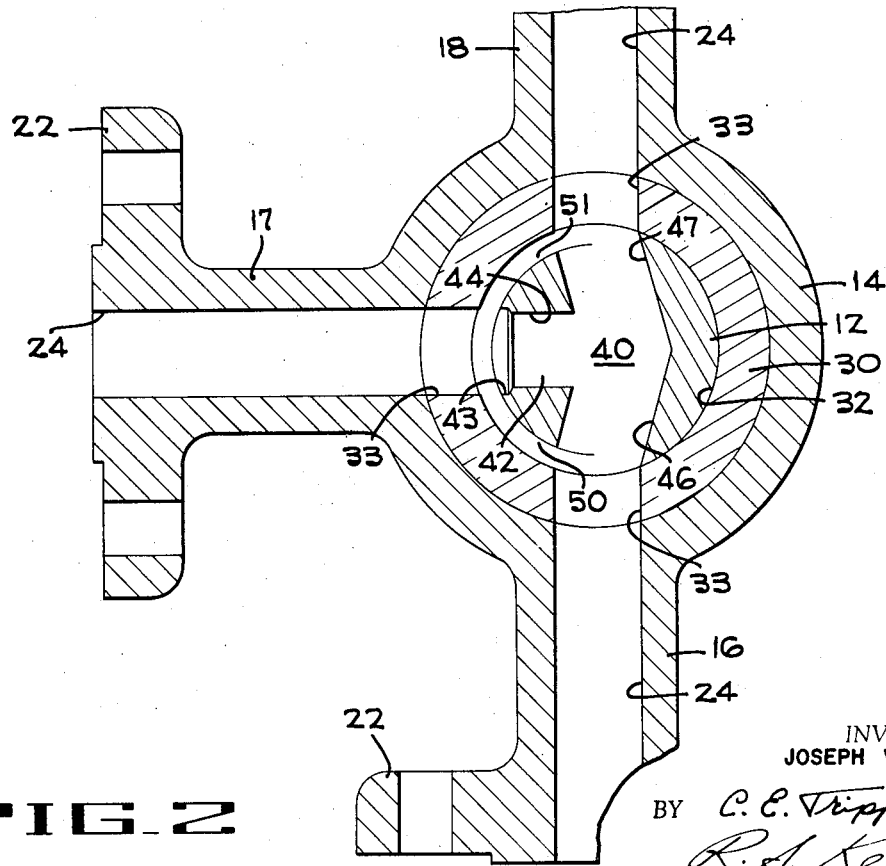
FIG_2
INVENTOR.
JOSEPH V. HOFFLAND
BY C.E. Tripp
R.S. Kelly
ATTORNEYS

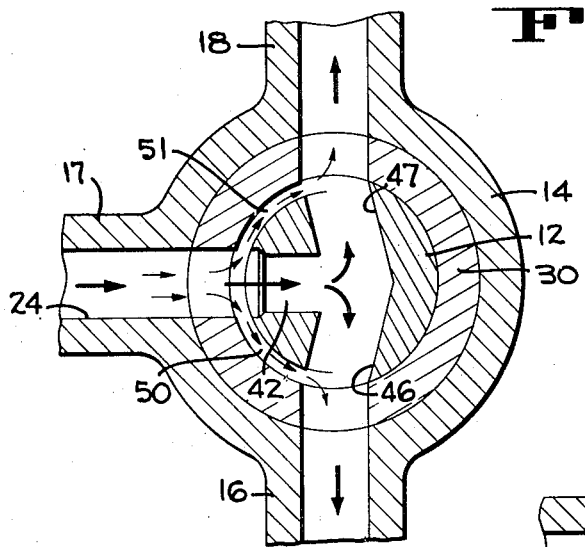
FIG_3
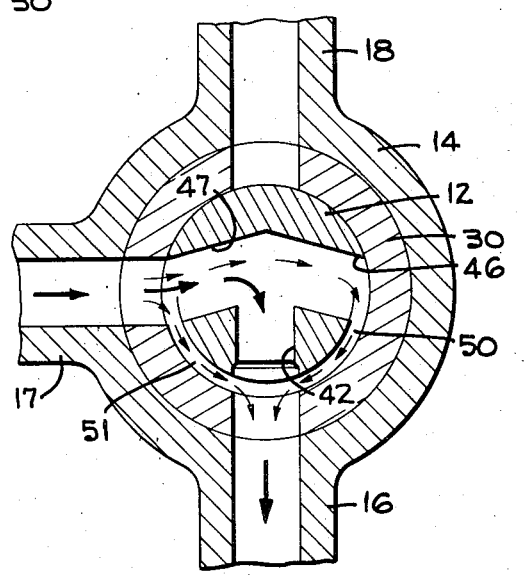
FIG_4
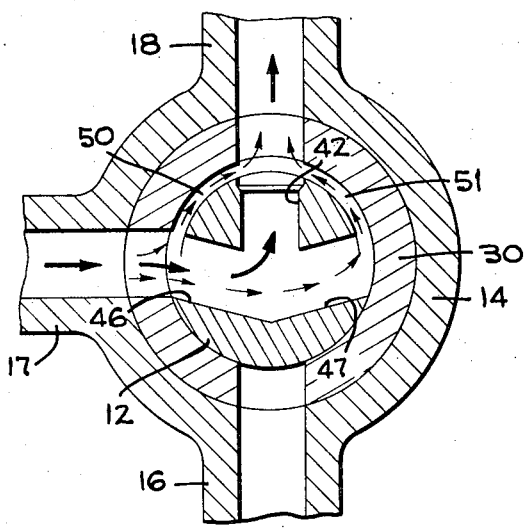
FIG_5
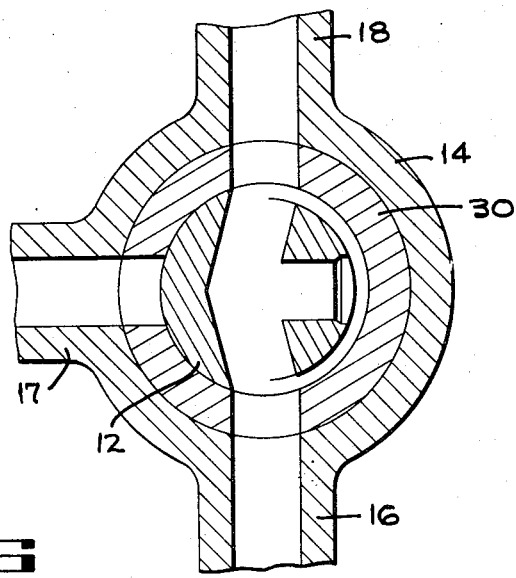
FIG_6

3,721,265

THREE-WAY VALVE

BACKGROUND OF THE INVENTION

1. Field of the Invention

The present invention pertains to valves, and more particularly, it pertains to valves having rotary plugs for selectively directing fluid between a plurality of ports.

2. Description of the Prior Art

Three-way valves having rotary plugs with generally T-shaped or three-legged passageways are in common usage today where it is desired to transfer fluid between a primary connection and either one or both of a pair of secondary connections. By rotating the plug, which may be cylindrical, spherical or conical in shape, the center leg of the plug passageway can be oriented so as to communicate with primary connection while the adjacent passageway legs are in communication with the secondary connections. By further rotating the plug, approximately 90° with the usual T-shaped plug passageway, the center leg is moved into communication with one of the secondary connections while one of the adjacent legs is placed in communication with the primary connection and the other secondary connection is blocked. By rotating the plug approximately 180° from this last position, it will be appreciated that the center leg will be placed in communication with the other secondary connection while the other leg of the plug passageway is in communication with the primary connection and said one secondary connection is blocked. It will be recognized, however, that each of the latter two rotative positions of the plug will leave one leg of the plug passageway blocked by the valve body at the face of the plug. This portion of the plug passageway will then constitute a dead space within the plug where fluid which is transferred through the valve will be excluded from the main flow stream and can stagnate.

Where time-degradable fluids, such as molten polyester, are pumped or otherwise passed through the valve the problem of possible stagnation becomes a serious one which can produce undesirable effects in the fluid conducted through the valve, in the process in which the fluid is applied, or in the functioning of the fluid handling equipment including the valve itself. Consequently, there has been a continuing effort made in the valve manufacturing field to provide a new design for the rotary plug of a three-way valve which design will eliminate, or at least substantially reduce, the possibility of stagnation of fluid within the plug when the plug is rotated into certain active operating positions.

One attempt to avoid the aforedescribed problem has been the provision of a plug for a three-way valve wherein the walls of the plug between the plug passages have been removed to leave only a single, enlarged passage in the plug. This plug need only be rotated approximately 45° from its position directing flow to or from both secondary connections to a position directing flow to or from only one of the secondary connections. While such a valve partially eliminates the stagnation problem in that it eliminates the blind passageway within the plug, the valve still has blind corners and resultant dead spaces within the plug that are removed from all flow paths and in which spaces stagnation can occur. Therefore, such valves have not proved to be an entirely satisfactory solution to the problem posed by time-degradable materials and their transference through a three-way valving system.

SUMMARY OF THE INVENTION

With the three-way valve of the present invention, the aforedescribed stagnation problems are substantially completely eliminated. A rotary plug is provided which has a generally three-legged passageway within the plug for selectively directing fluid between a primary connection and a pair of secondary connections as with the rotary plugs of the prior art. However, the exterior surface of the plug of the present invention is grooved between one leg of the three-legged passageway and the other two legs thereof so as to provide secondary passages for the fluid about the periphery of the plug which will ensure some flow through each of the legs of the plug passageway in each active position of the valve, i.e., in each valve position wherein there is a continuous transfer of fluid between the external flow connections. These secondary passageways specifically provide a means to move the fluid through the normally blocked passage in the plug when the plug has been rotated so as to transfer fluid between the primary connection and only one of the secondary connections.

The modified plug design of the present invention which provides the foregoing advantage in the handling of certain fluids is relatively simple and does not require complex and expensive machining operations to be performed on the plug. Consequently, the valve of the present invention can be economically and competitively produced. Furthermore, it should be noted that none of the basic operating functions of the conventional three-way valve are sacrificed, and the performance characteristics of the conventional three-way valve are not degraded in any way.

While the invention is shown and described herein as embodied in a tapered valve having a frustoconical external configuration, it will be recognized that the principles and concepts of the present invention can also be adapted to the spherical plug or ball-type valve or to the cylindrical plug valve.

BRIEF DESCRIPTION OF THE DRAWINGS

FIG. 1 is a central section through the three-way valve of the present invention.

FIG. 2 is a horizontal section taken along the line 2—2 of FIG. 1.

FIGS. 3, 4, 5 and 6 are reduced horizontal sections of the valve of the present invention, similar to FIG. 2, showing the four operative positions of the valve and indicating with arrows the direction of movement of the fluid through the valve.

DESCRIPTION OF THE PREFERRED EMBODIMENT

The preferred form of the three-way rotary plug valve is shown in FIGS. 1 and 2 of the drawings wherein a generally frusto-conical plug 12 is mounted for rotation within a valve body 14. The plug is provided with a stem 15 that extends outwardly from the valve body which stem is arranged to be turned by conventional means (not shown) to rotate the plug within the valve body. While the drawings and the present description are directed only to the preferred embodiment of the invention which utilizes a tapered plug of frusto-conical configuration, it will be recognized from the following description that the principles of the present invention can be applied to plugs having other geometrical configurations such as a spherical plug or a cylindrical plug.

The general structure of the rotary valve is entirely conventional wherein the valve body 14 is provided with three radially extending connector nozzles 16, 17 and 18 for attaching the valve to three external conduits with the central nozzle 17 being connected to a primary source of fluid and with the adjacent nozzles being connected to secondary discharge conduits. The nozzles are located in a common horizontal plane and are spaced 90° apart. Each of the nozzles is provided with an annular flange 22 at its distal end for connection to a conventional flanged pipe or the like, and each of the nozzles has a bore 24 extending therethrough and radially into the generally cylindrical body 14 of the valve.

Mounted securely inside of the body 14 of the valve is a valve seat 30 which has a tapered interior wall 32 adapted to mate with the tapered exterior surface of the rotary plug 12. The valve seat is sealed (by conventional means not shown) to the plug so as to permit relative rotation and has formed therein three radially extending ports 33 (FIG. 2) which are aligned with the bores 24 in the connector nozzles 16, 17 and 18. The plug is sealed within the valve body by conventional means including a packing retainer ring 34 (FIG. 1), which is fitted about the upper cylindrical wall of the valve body, and annular packing members 36 of compressible, resilient material which surround the stem 15 of the plug adjacent its lowermost end. The packing members are secured in sealing engagement with the stem by the retainer ring and by a packing gland 38 which also surrounds the valve stem and is pressed down against the packing members to compress them.

The present invention is concerned with the generally T-shaped or three-legged passageway 40 which extends in a horizontal plane through the plug to selectively communicate with the ports 33 in the valve seat and, hence, the bores 24 in the connecting nozzles 16, 17 and 18. This plug passageway includes a radially extending central passage 42 which has a short portion 43 extending inwardly from the exterior surface of the valve plug and a reduced portion 44 which extends into the center of the valve plug to the junction with the two adjacent passages 46 and 47. The axes of the passages 46 and 47 are spaced slightly less than 90° from the axis of the passage 42 and thereby intersect with each other at an angle of slightly less than 180°. Plug passages 46 and 47 extend radially outward from their juncture in the center of the plug to the exterior surface of the plug where they can mate with the ports 33 in the valve seat depending upon the rotative position of the plug.

As with conventional three-way valves having generally T-shaped fluid transfer passageways in the rotary plug element, the plug 12 of the present invention is designed to be rotated so that fluid will be transferred between the central passage or leg and one or both of the adjacent passages or legs of the T-shaped passageway. However, in the present invention, secondary passageways are provided between the central passage 42 and the outer passages 46 and 47 in order to continuously vent all of the interior passages in the plug. These secondary passageways comprise a pair of grooves 50 and 51 which connect the central passage 42 with the outer passages 46 and 47, respectively, with the grooves being cut into the peripheral surface of the plug and having a width generally corresponding to the diameter of the plug passages 42, 46 and 47. The purpose of these peripheral plug passages is, therefore, to make the valve self-purging which is particularly important when the plug is in certain rotative positions wherein flow is directed between only two of the three external connections. The reduced portion 44 of the plug passage 42 will create a slight pressure buildup in this passage to aid in getting flow through the peripheral passages 50 and 51.

Obviously, rates of flow through the various passages in the plug 12 will vary. However, since the pressure drops across all of the passages are equalized due to the design thereof, flow will be provided in all passages and stagnation within the plug will be prevented. Dimensional parameters of the passages and their particular contours may be varied to suit the particular characteristics of the fluid material adapted to be passed through the valve.

The operation of the valve of the present invention is shown diagrammatically in the operational views of FIGS. 3, 4, 5 and 6 with the flow paths through the valve being indicated with arrows.

FIG. 3 shows the main valve position wherein the central connector nozzle 17 is directing fluid to both of the side connector nozzles 16 and 18. Flow through the bore 24 in the central nozzle is directed to the central passage 42 of the plug and is then split between the side passages 46 and 47 which direct the flow, in turn, to the nozzles 16 and 18, respectively. In addition, a lesser amount of fluid is directed through the peripheral passages 50 and 51 to the nozzles 16 and 18, respectively, although this serves no useful purpose when the valve is in the position of FIG. 3.

In FIG. 4, the plug has been rotated 90° so that fluid from the central nozzle 17 is directed solely out the side nozzle 16 while the plug body blocks the other nozzle 18. It will be noted that the main body of the fluid will flow through the passage 47 and out the passage 42 to the nozzle 16 with some fluid also going through the narrow passageway 51 to the connector nozzle. However, fluid which flows into the generally blocked passage 46 will also be permitted to exit the valve to the nozzle 16 through the secondary passageway 50 so that there will be no passages which will be closed to flow and, consequently, no stagnation spaces within the plug.

In FIG. 5, a similar but opposite valve position is provided wherein the valve is rotated 180° from the position of FIG. 4 so as to direct fluid from the central nozzle 17 to the side nozzle 18 with the main body of the fluid passing from the passage 46 out the central passage 42. In this position of the valve, it will be seen that the generally blocked passage 47 is relieved by the peripheral passageway 51 so that fluid passes out of this passage without stagnating.

FIG. 6 shows a fourth, inoperative position of the rotary valve wherein the main inlet nozzle 17 is blocked so that no fluid will pass into the valve. While stagnation may occur here, such stagnation is inevitable during process shut-downs and can be compensated for by draining the valve ports and the external conduits prior to the resumption of pumping through the valve.

While the valve of the present invention has been described in connection with a pumping operation wherein fluid is transferred from a primary inlet source selectively to one or both of a pair of discharge conduits, it will be recognized that the transfer of fluid may be accomplished in the opposite direction also, i.e., with fluid flowing selectively from one of or both of a pair of inlets to a single discharge conduit. By reversing the direction of all of the arrows in FIGS. 3, 4 and 5, it will be seen wherein flow will be selectively directed from two separate inlet nozzles 16 and 18 into a single outlet nozzle 17 in the valve.

It will be seen that the three-way rotary plug valve of the present invention is provided with a unique design which overcomes a major problem encountered by the valves of the prior art wherein stagnation can occur when blind passages or blind corners are present in the internal porting of the rotary plug during certain rotative positions thereof. The structure of the valve is relatively simple and capable of being machined without undue expense. It will also be recognized that a trouble-free valve is provided which can be maintained more easily and at less cost than similar valves of the prior art.

Although the best mode contemplated for carrying out the present invention has been herein shown and described, it will be apparent that modification and variation may be made without departing from what is regarded to be the subject matter of the invention.

What is claimed is:

1. A three-way valve comprising a valve body having three flow ports therein, a plug rotatably mounted in said valve body, said plug having a passageway therein arranged for communication with said ports in the valve body with the passageway including three radially extending passages having a common junction at the central portion of said plug, said plug having a pair of shallow peripheral grooves extending about the exterior surface thereof from one of said passages to each of the other passages and providing flow communication therebetween so that there are two flow paths connecting the radially outer portion of said one passage with each of said other passages with said flow paths dividing the flow between said outer portion said one passage and one of said other passages, one of said flow paths being through the body of said plug along said radially extending passages which path is arranged to carry a major portion of said flow and the other of said flow paths being about the exterior surface of the plug which latter path is arranged to carry a minor portion of said flow, and means for rotating said plug to selectively transfer fluid between one port and either or both of the other ports of said valve with said peripheral grooves in the plug serving to prevent fluid from stagnating within said plug by providing a flow path through one of said peripheral grooves to an outlet port regardless of the relative rotative position of the plug.

2. A three-way valve according to claim 1 wherein said passage in the plug which communicates with both of said peripheral grooves has at least a portion thereof which is of a smaller diameter than the diameters of the other passages in said plug.

3. A three-way valve according to claim 1 wherein said plug is of generally frusto-conical configuration.

4. A three-way valve according to claim 1 wherein said passageway in the plug is generally T-shaped in cross-section with the individual passages thereof extending in a common plane.

5. A three-way valve according to claim 4 wherein said peripheral grooves in the surface of the plug extend from the central passage in said T-shaped passageway to each of the adjacent passages spaced generally 90° therefrom in said common plane.

6. A three-way valve according to claim 5 wherein the axes of the passages adjacent to said central passage intersect to form an angle of slightly less than 180° measured through said central passage in said common plane.

* * * * *